United States Patent
Kitchen

(10) Patent No.: US 6,830,700 B1
(45) Date of Patent: Dec. 14, 2004

(54) METHOD AND DEVICE FOR REMOVING PARTICLES FROM LIQUID

(75) Inventor: Richard Michael Kitchen, Dearborn Heights, MI (US)

(73) Assignee: Kolene Corporation, Detroit, MI (US)

( * ) Notice: Subject to any disclaimer, the term of this patent is extended or adjusted under 35 U.S.C. 154(b) by 14 days.

(21) Appl. No.: 10/615,310

(22) Filed: Jul. 8, 2003

(51) Int. Cl.[7] .............................................. B01D 21/02
(52) U.S. Cl. ................... 210/803; 210/523; 210/532.1; 366/262; 148/212; 148/238; 148/242
(58) Field of Search ................................. 210/800, 803, 210/523, 525, 532.1; 366/262; 148/212, 238, 242

(56) References Cited

U.S. PATENT DOCUMENTS

| | | | | |
|---|---|---|---|---|
| 2,293,183 A | * | 8/1942 | Walker | 261/93 |
| 3,228,526 A | * | 1/1966 | Ciabattari et al. | 210/221.1 |
| 3,795,225 A | * | 3/1974 | Ogui | 119/248 |
| 4,045,522 A | * | 8/1977 | Nafziger | 261/93 |
| 4,328,175 A | * | 5/1982 | Roeckel et al. | 261/91 |
| 4,888,294 A | * | 12/1989 | Van Wezel et al. | 435/297.3 |
| 4,957,624 A | * | 9/1990 | Peranio | 210/129 |
| 5,942,116 A | * | 8/1999 | Clark et al. | 210/603 |
| 6,036,863 A | * | 3/2000 | Brockdorff | 210/616 |
| 6,723,240 B1 | * | 4/2004 | Minemura | 210/497.01 |

* cited by examiner

*Primary Examiner*—Robert James Popovics
(74) *Attorney, Agent, or Firm*—William N. Hogg

(57) ABSTRACT

A method and device for removing particulate matter from a liquid medium, especially a molten salt bath. The structure includes a device for capturing and removing particulate matter from a liquid medium. In operation, the device is inserted into the liquid having the particulate matter, with a particulate matter collector in the particle collecting position. An agitator circulates the liquid having the particulate matter therein. A portion of the particulate matter is collected in the particulate matter collector during the circulation. Thereafter, the circulation is ceased and the device is removed from the liquid with the particulate matter in the particulate matter collector. The device is moved to a discharge position, and the particulate matter collector is moved to a particle discharge position to discharge the particulate matter.

10 Claims, 3 Drawing Sheets

METHOD AND DEVICE FOR REMOVING PARTICLES FROM LIQUID

FIELD OF THE INVENTION

This invention relates generally to a device and method of separating particles contained in a liquid medium and, more particularly, to a device and method of removing sludge from molten salt bath. In even more particular aspects, the invention relates to a device that can periodically be inserted into a liquid medium that contains particulate material, and a method of using the device to capture and remove the particulate material therefrom.

BACKGROUND OF THE INVENTION

Although the invention has application generally where particles in a liquid need to be separated, it is specifically designed for separating particles contained in molten salt baths as sludge which results from the surface treatment of various parts. The invention, although not specifically limited thereto, is particularly useful in removing sludge from a liquid salt bath, especially from an alkali molten salt bath used to quench parts that have been nitrided in a liquid salt nitriding bath. In this process, the parts to be nitrided are immersed for a time in a liquid salt nitriding bath at nitriding temperatures and they are then quenched in a liquid alkali metal carbonate bath. In one aspect of using the quenching bath, the nitrided and quenched parts are polished and then quenched again in the liquid alkali molten salt bath. In both of these instances, a certain amount of particulate matter in the form of "sludge" builds up, which results from surface oxides and other surface contaminants which are removed from the surface of the parts being quenched. As the sludge builds up, the efficiency of the bath degrades, eventually to the point where the bath is no longer commercially viable. At this point in time, either the sludge has to be removed, or the entire bath bailed out and reconstituted. Prior art techniques of sludge removal have not been completely successful in some instances, and bailing out the bath and starting over can be very expensive.

Therefore, it is desired to have an effective way to remove particles from a liquid bath, especially sludge from a molten salt bath.

SUMMARY OF THE INVENTION

A method and device for removing particulate matter from a liquid medium, especially a molten salt bath, are provided. The structure includes a device for capturing and removing particulate matter from a liquid medium. The device includes a hollow tubular member having a first end and a second end, with an agitator disposed in the hollow tubular member and configured to generate circulation of the liquid with the particulate matter disposed therein. Fluid return openings are provided in the hollow tubular member to allow fluid to enter into the tubular member. A particulate capturing member is slidably mounted on the hollow tubular member and movable from a particulate retaining position to particulate discharging position. The device also includes a mechanism for engaging and moving said device into and out of the liquid.

In operation, the device is inserted into the liquid having the particulate matter, with the particulate matter collector in the particle collecting position. The agitator circulates the liquid having the particulate matter therein. A portion of the particulate matter is collected in the particulate matter collector during the circulation. Thereafter, the circulation is ceased and the device is removed from the liquid with the particulate matter in the particulate matter collector. The device is moved to a discharge position, and the particulate matter collector is moved to the particle discharge position to discharge the particulate matter.

DESCRIPTION OF THE PREFERRED EMBODIMENTS

Figure 1:
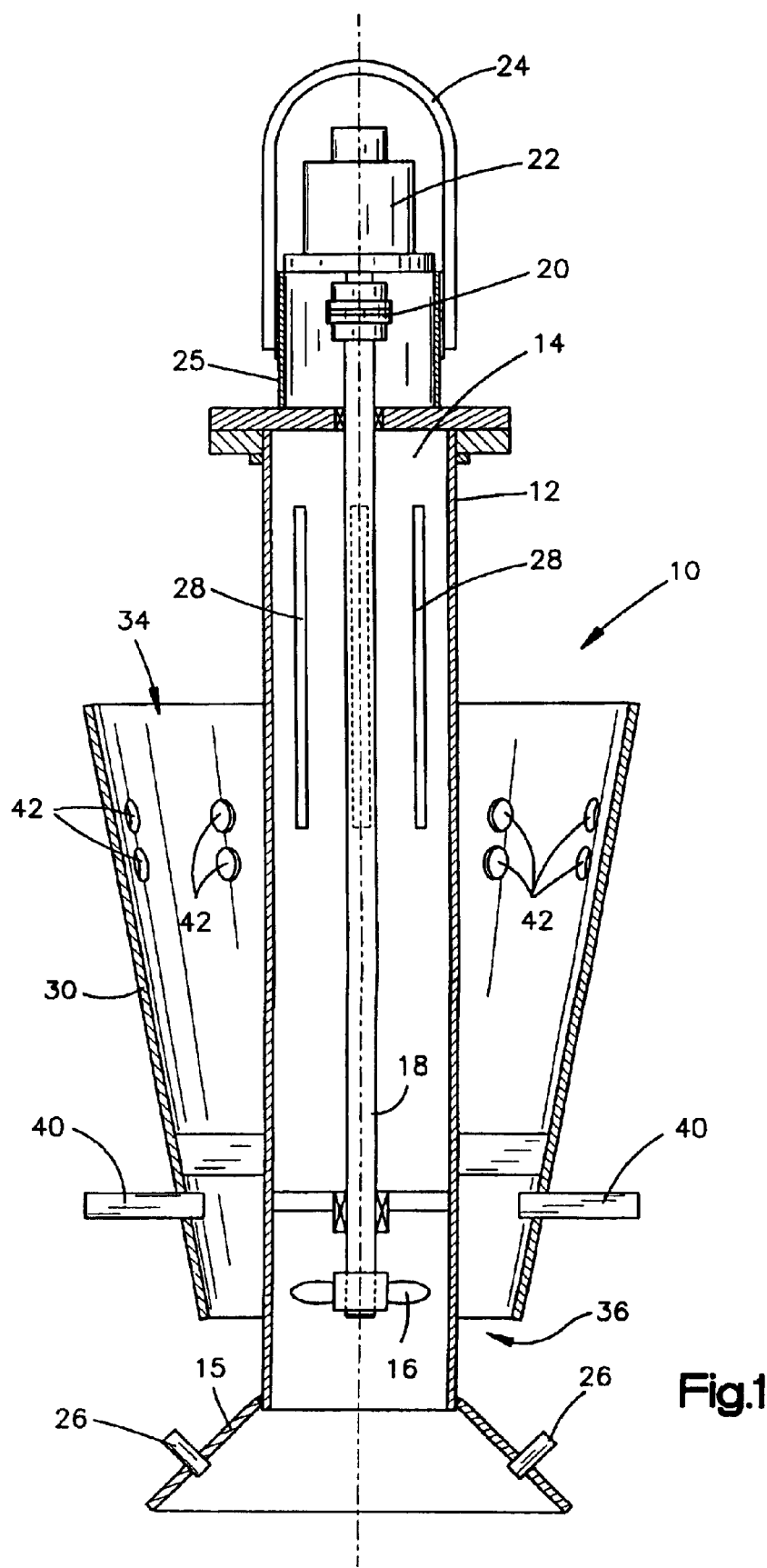
FIG. 1 is a longitudinal, sectional view of a particle collection and disposal device.

Referring now to the drawings, one embodiment of a particle collection and disposal device according to this invention is shown. As indicated earlier, the present invention is especially adapted to periodically remove particles in the form of sludge from a molten salt bath and dump the sludge. It is that context in which the invention will be described. However, also as indicated earlier, the device and its use are not so limited, and can find use in other situations where particles are to be removed from other liquids.

Referring now to FIG. 1, a device, generally designated as 10, for removing particles from a liquid and disposing of them, and which device is especially adapted to remove sludge from a molten salt bath and dump it, is shown. The device 10 includes a hollow central tube member 12 having a longitudinal extending axial opening 14, which has a flared open bottom end 15. A propeller 16 is disposed in the opening 14 near the open bottom end 15. The propeller 16 is mounted on a propeller shaft 18, which shaft 18 is connected by a coupling 20 to a motor 22 to drive the propeller 18. A lifting bail 24 is attached to end member 25 secured to the tube 12 opposite the flared end 15. A plurality of restraining pins 26 are circumferentially arranged around the flared end 15 and projecting therefrom, the purpose of which will be explained presently. A plurality of circumferentially arranged slots 28 are provide in the tube 12 near the end member 25 communicating with the axial opening 14.

A particle collecting member 30 is provided which surrounds the tube 12. The member 30 is generally frustro-conically shaped with the large end opening 34 oriented upwardly, and the small end opening 36 oriented generally downwardly and, in the sludge collecting position, forming a seal with the flared end 15 of the tube 12. The restraining pins 26 maintain the member 30 in place and assure a proper nesting of the member 30. The member 30 also has a plurality of circumferentially arranged resting rods 40 and a plurality of small drain openings 42 arranged around the periphery near the end 34 thereof.

Figure 2:
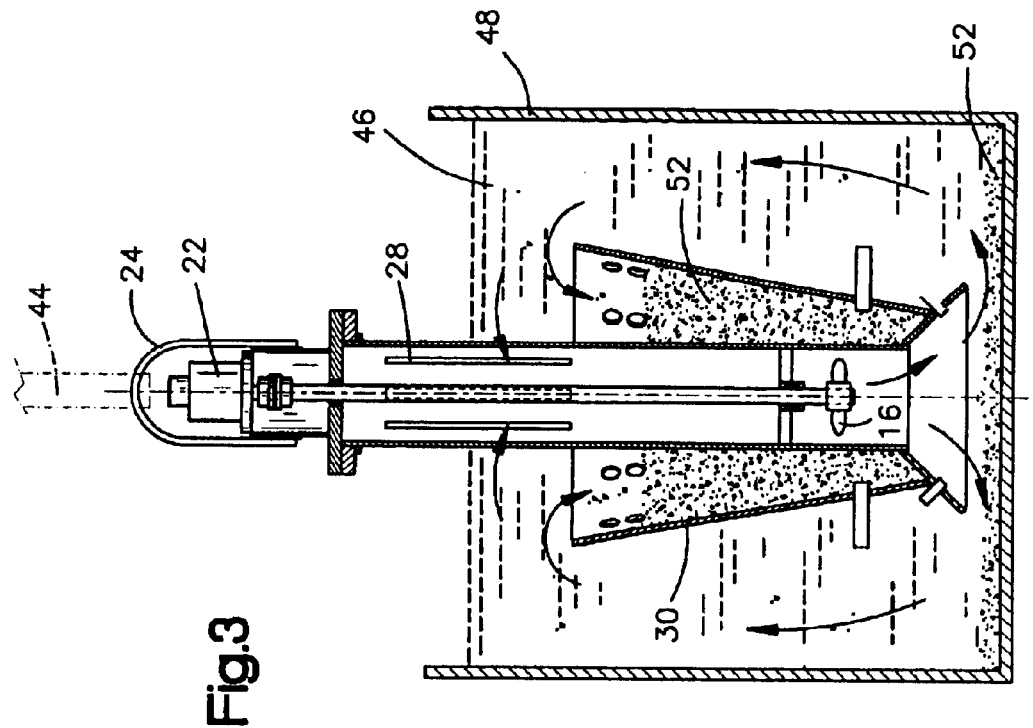
FIG. 2 is a somewhat diagrammatic view of the device of FIG. 1 according to this invention, submerged in a molten salt bath with sludge as it is initially starting to collect sludge.

FIGS. 2 through 5 show the various phases of operation of the device 10 to remove and dispose of sludge from a molten salt bath. As shown in FIG. 2, the device is hung by its bail 24 on a hook 44 and lowered into a salt bath 46 contained in a tank 48. Particles in the form of sludge 52 will have settled to the bottom of the bath 46. (It is to be understood that the tank 48, the bath 46 and sludge 52 are shown only very schematically to illustrate the operation of the device 10.) When the flared end 15 of the tube 14 is near the bottom of the tank 48, the lowering of the device 10 is stopped and the motor 22 is actuated to start the propeller 16. This will cause a circulation of the liquid down through axial opening 14, out the flared end 15, upwardly in the bath 46 and in through the slots 28, as shown by the arrows in FIG. 2. As the salt of the bath 46 passes the open end 34 of the particle collector 30 on the way to the slots 28, some of the particles of sludge 52 settle into the particle collector 30, also as shown by the arrows in FIG. 2.

Figure 3:
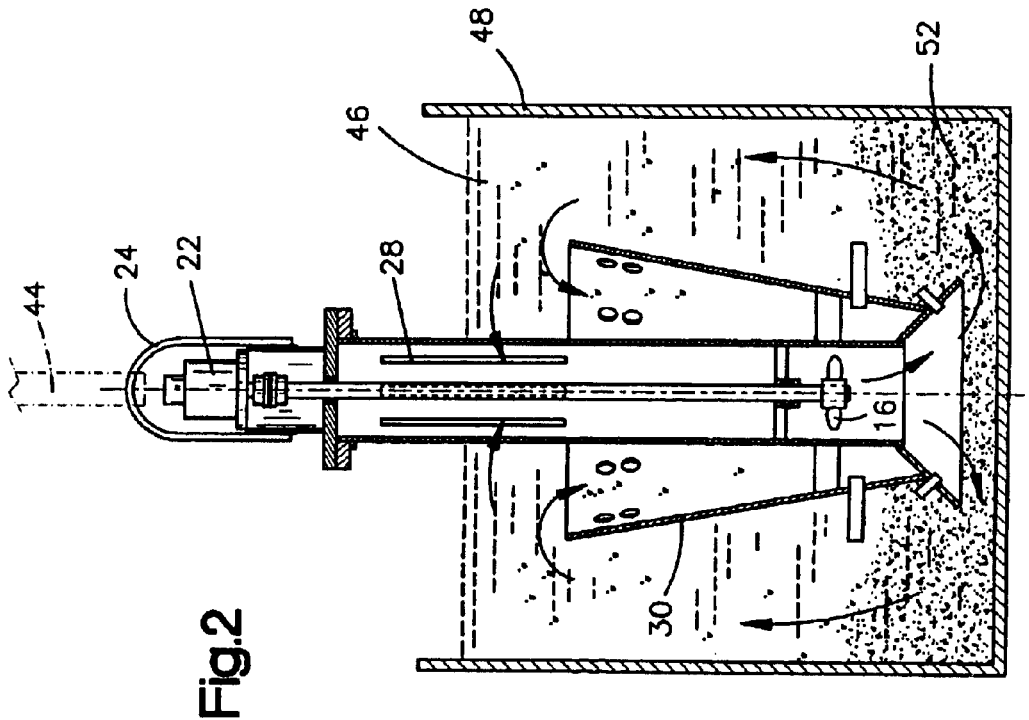
FIG. 3 is a view similar to FIG. 2 showing the particle collection and disposal device in use after it has collected a significant amount of sludge.

The device 10 is left in the bath on hook 44 with the propeller 16 running for a period of time until the collection member 30 is filled to a predetermined amount, or until no more appreciable amount of sludge is settling in the collection member 30. This condition is shown in FIG. 3. This time may vary, but can be determined by occasionally lifting the device 10 partially out of the bath 46, using hook 44 and observing the amount of sludge in the member 30. However, if the same type of bath is desludged several times, the operator will have a good "sense" of when the member 30 is full, or no more sludge is being collected.

Figure 4:
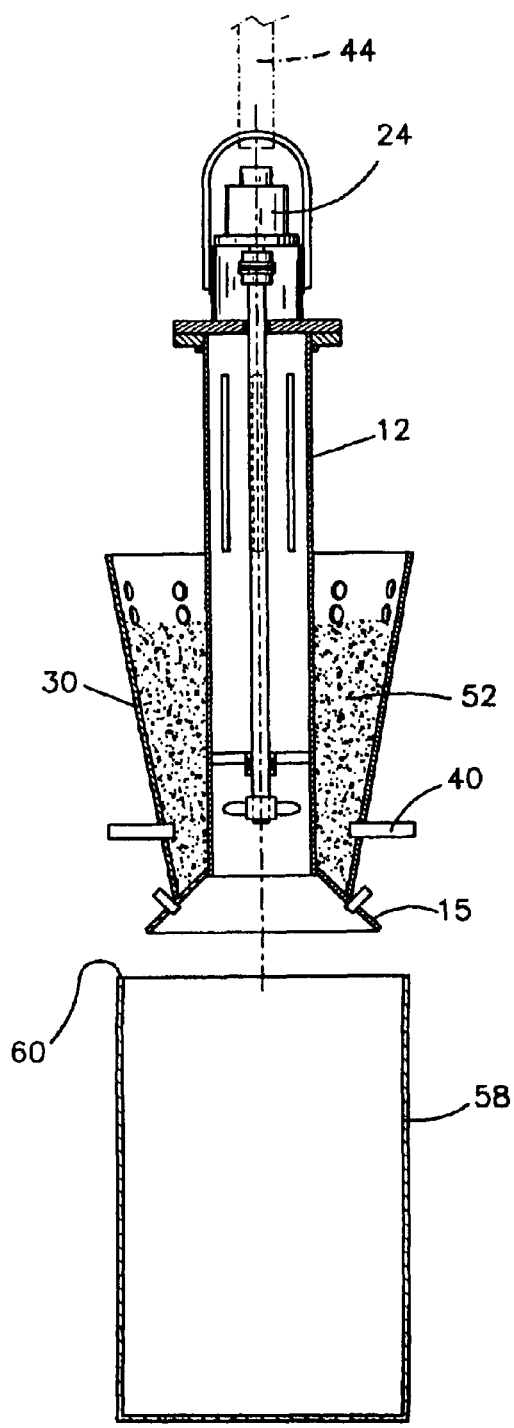
FIG. 4 is a somewhat diagrammatic view of the device of FIG. 1, removed from the salt bath with sludge contained therein and in position to be dumped into a 55 gallon drum.

When ready, the device 10 is lifted out of the bath 46 and, after a short drainage time through drainage openings 42 over the bath 46, is moved in position over a disposal unit, which in the preferred case is a 55 gallon drum 58, as shown in FIG. 4. Since the sludge collection member 30 forms a seal with the flared end 15 of tube 14, there is very little leakage of sludge 52 from the device 10.

Figure 5:
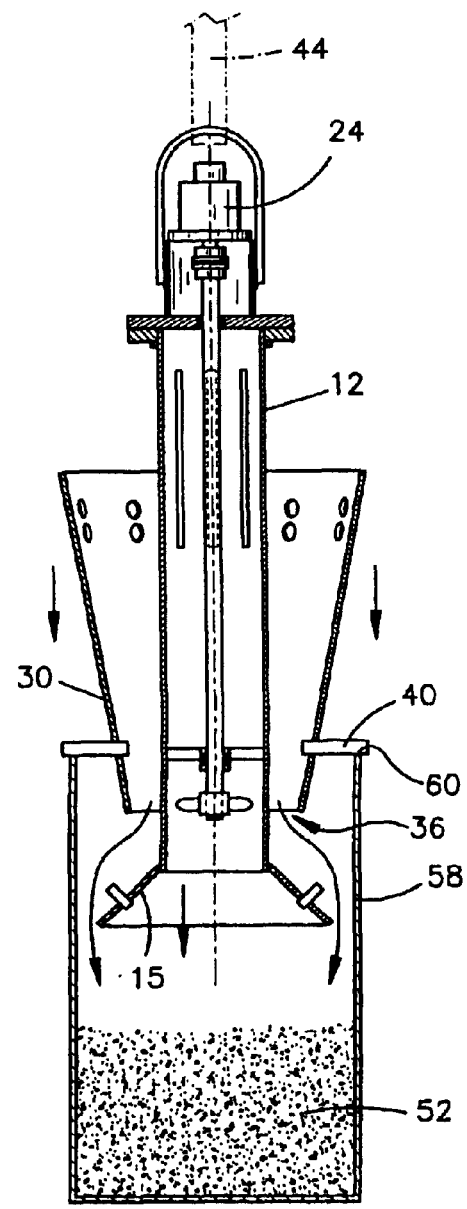
FIG. 5 is a view similar to FIG. 4 showing the sludge contained in the device being dumped into a 55 gallon drum.

One of the most important aspects of this invention is the removal of the sludge 52 from the device 10. This is shown in FIG. 5. The device, still supported on hook 44, is placed over the 55 gallon drum 58 and lowered. As the device is lowered, the resting rods 40 on collection member 30 engage rim 60 of the 55 gallon drum 58 and restrain its further movement. However, continued downward movement will result in the tube 14 continuing its downward movement, opening the seal between the flared end 15 of the tube 14 and the collection member 30. This will allow the sludge to empty into the 55 gallon drum 58, all as shown in FIG. 5. Upon lifting of the device 10 from the drum 58, the tube 14 will slide up the collection member 39, reestablishing the seal between the flared end 5 of tube 14 and the collection member 30, and rendering the device 10 ready for another collection of sludge.

Accordingly, the preferred embodiments of the present invention have been described. With the foregoing description in mind, however, it is understood that this description is made only by way of example, that the invention is not limited to the particular embodiments described herein, and that various rearrangements, modifications, and substitutions may be implemented without departing from the true spirit of the invention as hereinafter claimed.

What is claimed is:

1. A method for removing particulate matter from a liquid medium comprising the steps of:

A. providing a device for capturing and removing particulate matter from a liquid medium comprising;
      1) a hollow tubular member having a first end and a second end;
      2) an agitator disposed in said hollow tubular member and configured to generate circulation of the liquid with the particulate matter disposed therein;
      3) fluid return openings in said hollow tubular member to allow fluid to enter into the tubular member;
      4) a particulate capturing member slidably mounted on said hollow tubular member and movable from a particulate retaining position to particulate discharging position;
      5) a mechanism for engaging and moving said device into and out of said liquid;
   B. inserting said device in said liquid having the particulate matter, with the particulate matter collector in the particle collecting position;
   C. causing the agitator to circulate the liquid having the particulate matter therein to circulate and collect a portion of the particulate matter in the particulate matter collector during said circulation;
   D. ceasing the circulation;
   E. removing the device from the liquid with the particulate matter in said particulate matter collector to a discharge position; and
   F. moving the particulate matter collector to the particle discharge position.

2. The invention as defined in claim 1 wherein said particulate capturing member is in sealing engagement with said tubular member when in the particulate capturing position.

3. The invention as defined in claim 2 wherein said particulate capturing member is generally frustro-connically shaped.

4. The invention as defined in claim 2 wherein said particulate collecting member has at least one surface positioned to engage an external receptacle to cause relative sliding movement of said particulate gathering member with respect to said tubular member, and moving the particulate collecting member to the particulate discharge position includes engaging these surfaces.

5. The invention as defined in claim 2 wherein said at least one surface includes at least one member attached to said particle collecting member.

6. The invention as defined in claim 1 wherein said agitator includes a propeller mounted on a propeller shaft.

7. The invention as defined in claim 6 wherein said propeller is disposed within said hollow tubular member.

8. The invention as defined in claim 1 wherein said particulate collecting member includes drain openings to allow fluid to drain therefrom when the device is removed from the liquid.

9. The invention as defined in claim 1 wherein said mechanism for engaging and moving said device is connected to said tubular member.

10. The invention as defined in claim 1 wherein the liquid is a molten salt and the particulate matter is sludge.

* * * * *